United States Patent
Meyer et al.

(10) Patent No.: US 12,092,759 B2
(45) Date of Patent: Sep. 17, 2024

(54) RADAR BEAMFORMING BY WAY OF LATENT SPACE ENCODING

(71) Applicant: GM Cruise Holdings LLC, San Francisco, CA (US)

(72) Inventors: Michael Meyer, Munich (DE); Georg Kuschk, Garmisch-Partenkirchen (DE)

(73) Assignee: GM CRUISE HOLDINGS LLC, San Francisco, CA (US)

( * ) Notice: Subject to any disclaimer, the term of this patent is extended or adjusted under 35 U.S.C. 154(b) by 258 days.

(21) Appl. No.: 17/565,870

(22) Filed: Dec. 30, 2021

(65) Prior Publication Data
US 2023/0204721 A1 Jun. 29, 2023

(30) Foreign Application Priority Data

Dec. 23, 2021 (EP) ................................. 21217640

(51) Int. Cl.
| | |
|---|---|
| G01S 7/41 | (2006.01) |
| G01S 7/295 | (2006.01) |
| G01S 13/931 | (2020.01) |
| G06N 3/0455 | (2023.01) |
| G06N 3/088 | (2023.01) |

(52) U.S. Cl.
CPC ............. G01S 7/417 (2013.01); G01S 7/295 (2013.01); G06N 3/0455 (2023.01); G06N 3/088 (2013.01); G01S 13/931 (2013.01)

(58) Field of Classification Search
None
See application file for complete search history.

(56) References Cited

U.S. PATENT DOCUMENTS

2023/0108140 A1* 4/2023 Stadelmayer .......... G06V 40/28
342/104

FOREIGN PATENT DOCUMENTS

| EP | 4202475 A1 | 6/2023 |
| WO | 2019195327 A1 | 10/2019 |

OTHER PUBLICATIONS

"Communication Under Rule 71(3) EPC for European Patent Application No. 21217640.8", Mailed Date: Nov. 8, 2023, 41 pages.
"Extended European Search Report for European Patent Application No. 21217640.8", Mailed Date: Jun. 28, 2022, 8 pages.
"Decision to Grant a European Patent Pursuant to Article 97(1) EPC for European Patent Application No. 21217640.8", Mailed Date: Apr. 5, 2024, 2 pages.

* cited by examiner

*Primary Examiner* — Whitney Moore
(74) *Attorney, Agent, or Firm* — Calfee, Halter & Griswold LLP (57) ABSTRACT

A radar sensor system receives or generates radar data indicative of radar returns received at an antenna array. An encoder neural network encodes the radar data into first embeddings defined in a first latent space. A transformer neural network receives the first embeddings and transforms the first embeddings to second embeddings defined in a second latent space. A decoder neural network receives the second embeddings and decodes the second embeddings to generate beamformed radar data.

20 Claims, 8 Drawing Sheets

RADAR BEAMFORMING BY WAY OF LATENT SPACE ENCODING

RELATED APPLICATION

This application claims priority to European Patent Application No. EP21217640.8, filed on Dec. 23, 2021, and entitled "RADAR BEAMFORMING BY WAY OF LATENT SPACE ENCODING". The entirety of this application is incorporated herein by reference.

BACKGROUND

Some current radar sensors employ phased antenna arrays to both transmit radar signals and receive radar returns. Conventionally, radar antennas have been mechanically scanned across a region desirably interrogated by a radar sensor. Phased antenna arrays can be mechanically fixed to a same position and electronically scanned across a desirably interrogated region using beamforming techniques. During transmission, beamforming is achieved by selective phase adjustment and amplitude weighting of different elements of an antenna array. For reception, beamforming is achieved by various signal processing techniques for analyzing radar returns received across an antenna array.

Radar sensors have found application on ships and aircraft for the purposes of target detection, ranging, and navigation. On land vehicles, radar sensors have also been used for ranging and target detection, but these sensors have conventionally been low-resolution and unsuited to use for navigation of a land vehicle in a crowded environment (e.g., on highways or city streets). Radar sensors that employ electronic beamforming on receipt of radar signals could potentially provide radar data of sufficiently high spatial resolution to be used for navigation of land vehicles. However, conventional receive-side beamforming algorithms tend to be computationally intensive and for some applications (e.g., real-time navigation of land vehicles) can require either prohibitively many computing resources (e.g., processing cycles or allocated memory) or a prohibitively long time to perform. Furthermore, the computational expense of performing receive-side beamforming tends to increase linearly as a number of antennas in a receive-side array is increased.

To address these difficulties, radar sensors employing receive-side beamforming have generally employed various heuristics to select subsets of received radar returns for receive-side beamforming, while discarding non-selected data. This approach reduces the amount of data that must be processed to perform receive-side beamforming, thereby reducing the time or computing resources needed to perform the receive-side beamforming. However, these approaches necessarily exclude potentially significant radar data from further consideration and analysis.

SUMMARY

The following is a brief summary of subject matter that is described in greater detail herein. This summary is not intended to be limiting as to the scope of the claims.

Described herein are various technologies pertaining to performing receive-side beamforming in a radar system. In an exemplary embodiment, a vehicle includes a radar sensor and a computing device. The radar sensor includes a transmit antenna, a receive antenna array, and a hardware logic component. The transmit antenna emits a radar signal into the driving environment of the vehicle as the vehicle moves through the driving environment. The receive antenna array receives reflections of the radar signal, called radar returns, from objects in the driving environment. The hardware logic component receives radar data that is indicative of the radar returns (e.g., from an analog-to-digital converter, or ADC, coupled to the receive antenna array or coupled to an analog signal processing component that performs various analog signal processing operations over the radar returns). The radar data can be representative of radar returns received from an entirety of a field-of-view (FOV) of the receive antenna array.

The hardware logic component and the computing device are configured to collectively compute receive-side beamforming data with respect to the radar data received by the hardware logic component. The beamforming data can be indicative of radar returns received from each of several subsets of the entire FOV of the receive antenna array.

In an exemplary embodiment, responsive to receiving the radar data, the hardware logic component encodes the radar data into a first embedding in a first latent space. In various embodiments, the hardware logic component encodes the radar data into the first embedding by providing the radar data as input to a first neural network. The first neural network is trained to receive radar data as input and to transform the radar data into a representation of the radar data in a first latent space, which representation is referred to herein as an embedding. The first neural network is configured such that the first embedding has a lower dimensionality than the radar data.

In various embodiments, the computing device receives the first embedding from the hardware logic component and transforms the first embedding in the first latent space to a second embedding in a second latent space. The hardware logic component can be configured to transform the first embedding to the second embedding by providing the first embedding to a second neural network that is configured to transform embeddings in the first latent space to embeddings in the second latent space. The second neural network is configured such that embeddings in the second latent space are representative of beamformed data, whereas embeddings in the first latent space are representative of radar data prior to beamforming. Embeddings in the first latent space can be considered to be encoded radar data prior to beamforming. Embeddings in the second latent space can be considered to be encoded beamformed radar data.

The computing device can be further configured to decode the second embedding to generate beamformed radar data. In an exemplary embodiment, the computing device provides the second embedding as input to a third neural network that is configured to map data from the second latent space into a space corresponding to the original radar data. Responsive to receiving the second embedding as input, the third neural network outputs the beamformed radar data. The beamformed radar data is indicative of a partial radar return received by the radar antenna array from a subset of the whole FOV of the radar antenna array. By way of example, the beamformed radar data can be indicative of a portion of the radar returns represented by the radar data that are received from a given angular direction.

In contrast with conventional approaches to receive-side beamforming, technologies described herein are suited to performing receive-side beamforming without requiring exclusion of some portion of the radar data from consideration by a beamforming method.

Whereas various acts of encoding, transforming, and decoding have been described above as being performed by either of the hardware logic component or the computing device, it is to be understood that any of such acts may be performed by the other of the hardware logic component or the computing device. For instance, in some embodiments all of these acts may be performed by the hardware logic component. In other embodiments, all of these acts may be performed by the computing device. In still other embodiments, the hardware logic component can perform the encoding and the transforming acts, and the computing device can perform the decoding.

In various embodiments, the vehicle described above can be an autonomous vehicle (AV) that is capable of navigating and traversing roadways without human conduction. In such embodiments, the computing device can include a perception component, a planning component and a control component. Responsive to the computing device generating the beamformed radar data, the computing device provides the beamformed radar data to the perception component, whereupon the perception component can identify locations of one or more objects in the driving environment of the vehicle based at least in part upon the beamformed radar data. The planning component of the vehicle can plan a route or maneuver for the vehicle based upon the identified locations of the one or more objects. For instance, the planning component can plan an evasion maneuver responsive to determining that an obstacle lies in a path of the vehicle. Responsive to the planning component planning the route or maneuver for the vehicle, the control component can control operation of one or more of a steering system, a braking system, or a vehicle propulsion system of the vehicle to effectuate motion of the vehicle in accordance with the planned route or maneuver.

The above summary presents a simplified summary in order to provide a basic understanding of some aspects of the systems and/or methods discussed herein. This summary is not an extensive overview of the systems and/or methods discussed herein. It is not intended to identify key/critical elements or to delineate the scope of such systems and/or methods. Its sole purpose is to present some concepts in a simplified form as a prelude to the more detailed description that is presented later.

DETAILED DESCRIPTION

Various technologies pertaining to performing receive-side beamforming of radar data are described herein. With more particularity, technologies described herein facilitate performing receive-side beamforming of radar data by performing a beamforming transformation over a latent space representation of received radar data. In the following description, for purposes of explanation, numerous specific details are set forth in order to provide a thorough understanding of one or more aspects. It may be evident, however, that such aspect(s) may be practiced without these specific details. In other instances, well-known structures and devices are shown in block diagram form in order to facilitate describing one or more aspects. Further, it is to be understood that functionality that is described as being carried out by certain system components may be performed by multiple components. Similarly, for instance, a component may be configured to perform functionality that is described as being carried out by multiple components.

Moreover, the term "or" is intended to mean an inclusive "or" rather than an exclusive "or." That is, unless specified otherwise, or clear from the context, the phrase "X employs A or B" is intended to mean any of the natural inclusive permutations. That is, the phrase "X employs A or B" is satisfied by any of the following instances: X employs A; X employs B; or X employs both A and B. In addition, the articles "a" and "an" as used in this application and the appended claims should generally be construed to mean "one or more" unless specified otherwise or clear from the context to be directed to a singular form.

Further, as used herein, the terms "component" and "system" are intended to encompass computer-readable data storage that is configured with computer-executable instructions that cause certain functionality to be performed when executed by a processor. The computer-executable instructions may include a routine, a function, or the like. It is also to be understood that a component or system may be localized on a single device or distributed across several devices. Further, as used herein, the term "exemplary" is intended to mean serving as an illustration or example of something and is not intended to indicate a preference.

As described herein, one aspect of the present technology is the gathering and use of data available from various sources to improve quality and experience. The present disclosure contemplates that in some instances, this gathered data may include personal information. The present disclosure contemplates that the entities involved with such personal information respect and value privacy policies and practices.

Figure 1:
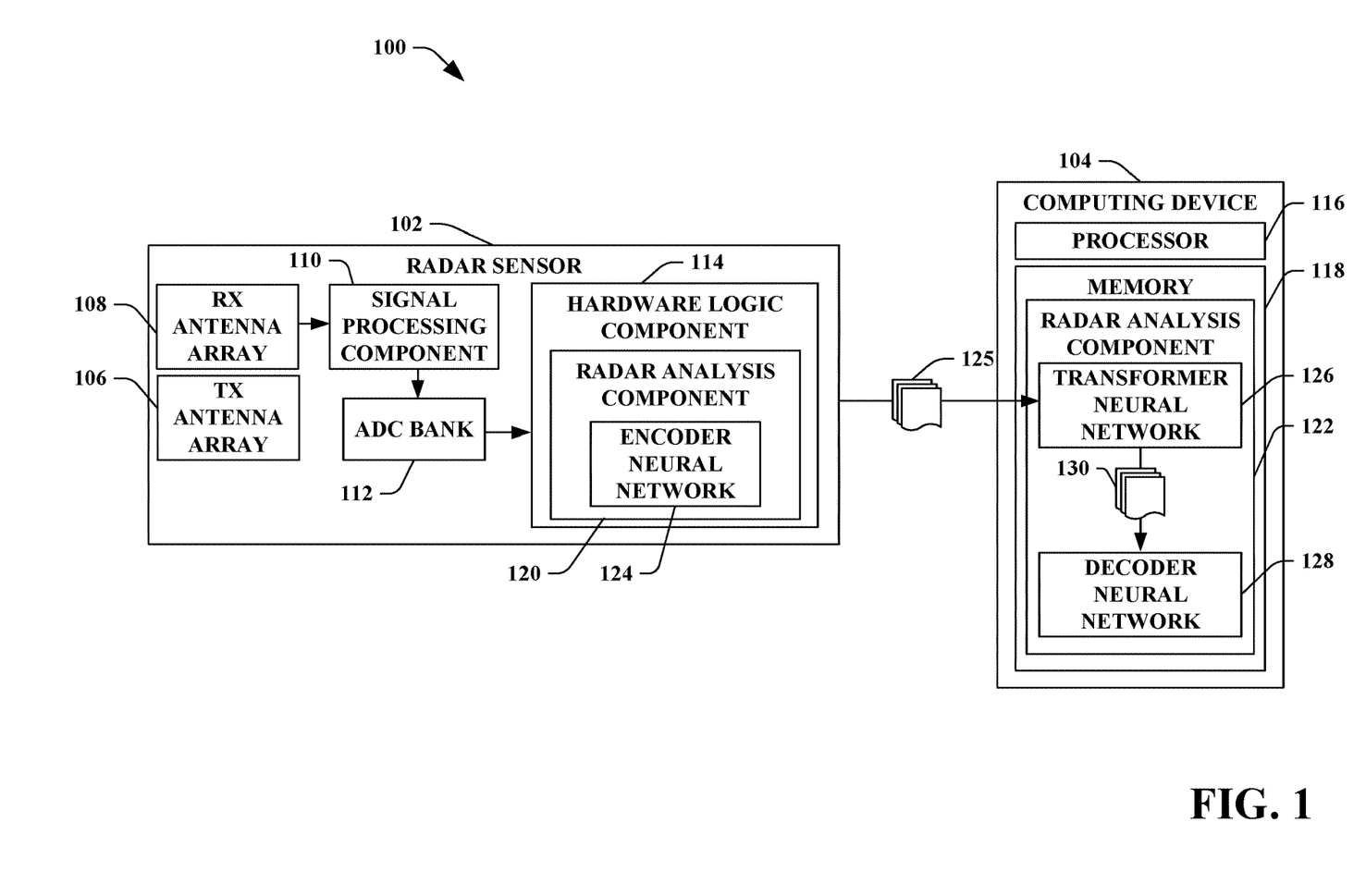
FIG. 1 is a functional block diagram of an exemplary radar sensor system for generating beamformed radar data by way of latent space encoding.

With reference now to FIG. 1, an exemplary radar system 100 is illustrated. The radar system 100 includes a radar sensor 102 and a computing device 104. The radar sensor 102 includes a transmit antenna array 106, a receive antenna array 108, a signal processing component 110, an ADC bank 112, and a hardware logic component 114. The computing device 104 includes a processor 116 and memory 118 that stores instructions that, when executed by the processor 116, cause the processor 116 to perform various acts.

The transmit antenna array 106 is configured to emit radar signals into an operational environment of the radar system 100. The receive antenna array 108 is configured to receive radar returns from objects in the operational environment. The receive antenna array 108 outputs electrical signals that are indicative of the radar returns. The electrical signals output by the receive antenna array 108 are received by the signal processing component 110. The signal processing component 108 is configured to perform various analog signal processing operations over the electrical signals. By way of example, and not limitation, the signal processing component 108 can include componentry configured to perform various signal processing operations such as filtering, signal conditioning, etc. The processed signals output by the signal processing component 110 are received by the ADC bank 112. The ADC bank 112 is configured to digitally sample the processed signals output by the signal processing component 110 and to output radar data that is indicative of the radar returns received by the receive antenna array 108. In exemplary embodiments, the hardware logic component 114 receives the radar data from the ADC bank 112. In other embodiments, the ADC bank 112 can be included as a component of the hardware logic component 114.

The hardware logic component includes a radar analysis component 120. The memory 118 of the computing device 104 further includes a radar analysis component 122. The radar analysis components 120, 122 are configured to collectively perform receive-side beamforming over the radar data output by the ADC bank 112. For simplicity, the radar analysis components 120, 122 are described herein as each performing various acts that, taken together, perform receive-side beamforming over the radar data output by the ADC bank 112. However, it is to be understood that, as used herein, reference to the radar analysis components 120, 122 (or similarly, the hardware logic component 114 and the computing device 104) collectively performing various acts is intended to encompass embodiments wherein the radar analysis component 120 exclusively performs such acts, wherein the radar analysis component 122 exclusively performs such acts, or each of the radar analysis components 120, 122 performs a respective portion of such acts.

Briefly, the radar analysis components 120, 122 collectively encode radar data in one or more first embeddings in a first latent space. The radar analysis components 120, 122 transform the one or more first embeddings to generate one or more second embeddings in a second latent space. As will be described in greater detail below, the first embeddings are representative of the radar data in the first latent space, while the second embeddings are representative of beamformed radar data in the second latent space. The radar analysis components 120, 122 then decode the one or more second embeddings, thereby generating beamformed radar data in a same space that corresponds to the original radar data output by the ADC bank 112. These beamformed radar data can then be employed for various purposes by the hardware logic component 114, the computing device 104, or other hardware logic or computing devices, as will be described in greater detail below. By way of example, and not limitation, the beamformed radar data can be employed by a computing device included on an autonomous vehicle (AV) for the purpose of identifying objects in a driving environment of the AV.

Various exemplary operations of the system 100 are set forth below in greater detail. As indicated above, responsive to receipt of radar data from the ADC bank 112, the radar analysis component 120 of the hardware logic component 114 encodes the radar data as one or more first embeddings in a first latent space. In an exemplary embodiment, the radar data output by the ADC bank 112 comprises channels of radar data, each of which is a subset of the full radar data. For example, each of the channels can be representative of radar returns from a respective antenna in the receive antenna array 108. In such embodiments, the radar analysis component 120 can encode each of the channels of radar data into a different respective embedding in the first latent space.

The radar analysis component 120 is configured to generate the first embeddings such that the first embeddings of the radar data in the first latent space have lower dimensionality than the original radar data received from the ADC bank 112. In an exemplary embodiment, the radar analysis component 120 includes an encoder neural network 124. The encoder neural network 124 receives the radar data as input and outputs the first embeddings of the radar data in the first latent space. As will be described in greater detail below, the encoder neural network 124 is trained as an encoder component of a first autoencoder.

Figure 2A:
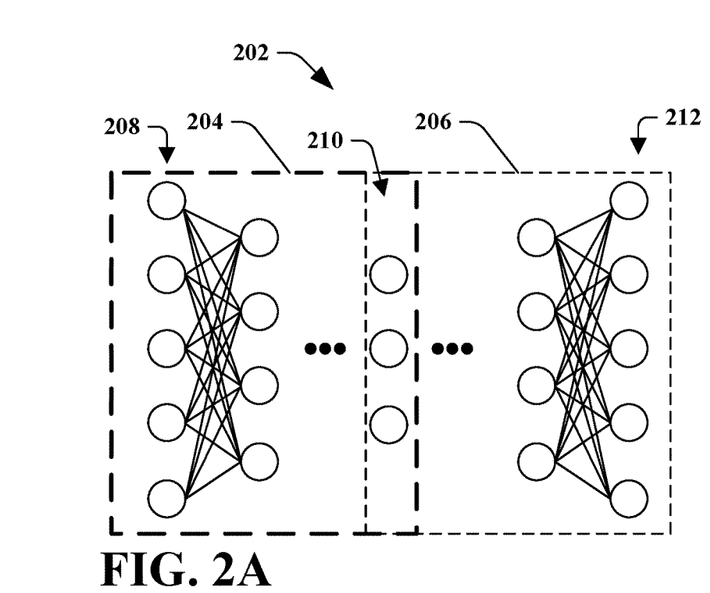
FIG. 2A is a diagram of an exemplary autoencoder.

By way of illustration, and referring now to FIG. 2A, an exemplary autoencoder 202 is shown, wherein the autoencoder 202 includes an encoder component 204 and a decoder component 206. The autoencoder 202 is a neural network that includes a plurality of layers. The encoder component 204 includes an input layer 208, and an output layer 210 that is an intermediate layer of the autoencoder 202 taken as a whole. The decoder component 206 takes the output layer 210 of the encoder component 204 as its input layer, and further includes an output layer 212. The autoencoder 202 is trained based upon a training radar dataset and is trained to reconstruct radar data provided as input to the autoencoder 202. Stated differently, the autoencoder 202 is trained to generate output at the output layer 212 of the decoder component 206 that is approximately equal to the input received at the input layer 208 of the encoder component 204.

As a result of the training of the autoencoder 202, the encoder component 204 of the autoencoder 202 is trained to generate, responsive to receipt of radar data as input, an embedding of the radar data in a latent space that has lower dimensionality than the original radar data. By way of example, and not limitation, the output layer 210 of the encoder component 204 can have a number of nodes that is less than a number of nodes of the input layer 208 of the encoder component 204. In other words, responsive to receipt of radar data at the input layer 208 that includes a first number of values, the encoder component 204 outputs, at the output layer 210, a second, smaller number of values that are representative of the radar data. The autoencoder 202 as a whole is configured such that the decoder component 206 can reconstruct the original radar data provided at the input layer 208 based upon the second set of values output by the output layer 210 of the encoder component 204.

Referring once again to FIG. 1, the encoder neural network 124 can be configured in similar fashion to the encoder component 204 of the autoencoder 202 depicted in FIG. 2. The encoder neural network 124 receives the radar data and outputs first embeddings 125 of the radar data in a first latent space. In exemplary embodiments, the radar data output by the ADC bank 112 can include a plurality of channels, wherein each channel comprises a subset of the radar data. By way of example, and not limitation, each of the channels of the radar data can be a portion of the radar data that is representative of returns from a different respective antenna in the receive antenna array 108. In various embodiments, the first embeddings 125 include a respective embedding for each of the plurality of channels of the radar data. By way of example, and not limitation, the first embeddings 125 can include a respective embedding for each antenna in the receive antenna array 108. Stated differently, in some embodiments each of the first embeddings 125 is representative of a different portion of the radar data, wherein each of the different portions of the radar data is in turn representative of radar returns from a different antenna in the receive antenna array 108.

In embodiments wherein the radar data output by the ADC bank 112 comprises a plurality of channels, radar analysis component 120 can be configured to generate the first embeddings 125 in parallel. In a non-limiting example, the radar analysis component 120 can execute, in parallel, a plurality of N instances of the encoder neural network 124, where N is a positive integer number of channels of the radar data. In this example, each of the instances of the encoder neural network 124 receives as input a different respective channel of the radar data and outputs a different embedding. Thus, collectively, the N instances of the encoder neural network 124 output the first embeddings 125 such that the first embeddings 125 includes N embeddings.

The radar analysis component 120 outputs the first embeddings 125 to the computing device 104. The radar analysis component 122 that is executed by the computing device 104 comprises a transformer neural network 126 and a decoder neural network 128. The radar analysis component 122 provides the first embeddings 125 as input to the transformer neural network 126. Responsive to receipt of the first embeddings 125, the transformer neural network 126 outputs second embeddings 130 that are defined in a second latent space. As will be described in greater detail below, the second latent space is a latent space in which embeddings that are representative of beamformed radar data are defined. In other words, a set of beamformed radar data is represented by and recoverable from an embedding in the second latent space, where the embedding has lower dimensionality than the beamformed radar data.

The decoder neural network 128 receives the second embeddings 130 from the transformer neural network 126 and, based upon the second embeddings 130, outputs beamformed radar data. In exemplary embodiments, the beamformed radar data comprises a plurality of beams, each of which is a subset of the total beamformed radar data. Each of the beams can be a portion of the beamformed radar data that is representative of radar returns received by the receive antenna array 108 from a particular portion of the overall FOV of the receive antenna array 108. For example, if the FOV of the receive antenna array 108 is 60 degrees and the beamformed radar data includes 12 beams, each of the beams can be representative of radar returns received from a different five-degree portion of the overall FOV of the receive antenna array 108. The number of the beams can be dependent upon a number of the second embeddings 130 output by the transformer neural network 126, which can be a function of design of the transformer neural network 126.

In order to facilitate understanding, various aspects pertaining to the decoder neural network 128 are now described. The decoder neural network 128 is trained as a decoder component of an autoencoder that is distinct from the autoencoder of which the encoder neural network 124 forms a part. In other words, the encoder neural network 124 is trained as an encoder component of a first autoencoder, and the decoder neural network 128 is trained as a decoder component of a second autoencoder. The second autoencoder of which the decoder neural network 128 forms a part is trained such that the decoder neural network 128 receives embeddings defined in a second latent space as input and outputs beamformed radar data.

Figure 2B:
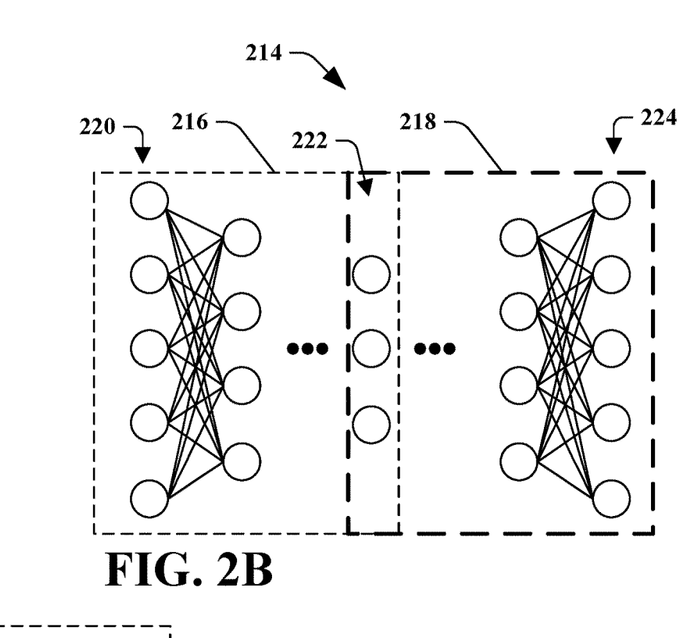
FIG. 2B is a diagram of another exemplary autoencoder.

By way of example, and referring now to FIG. 2B, a second autoencoder 214 is shown. The second autoencoder 214 is a neural network that includes an encoder component 216 and a decoder component 218. In exemplary embodiments, the decoder neural network 128 can be configured in substantially similar fashion to the decoder component 218. The encoder component 216 has an input layer 220 that forms an input layer of the second autoencoder 214. An output layer 222 of the encoder component 216 forms an input layer of the decoder component 218. Thus, the terminal layer 222 is referred to alternately herein as the input layer 222 of the decoder component 218. An output layer 222 of the decoder component 218 forms the output layer of the second autoencoder 214.

The second autoencoder 214 is trained to reconstruct its input. Stated differently, the second autoencoder 214 is trained to generate output at its output layer 224 that is equal or approximately equal to input that the second autoencoder 214 receives at its input layer 220. The second autoencoder 214 is trained based upon beamformed radar data. As a result of the training of the second autoencoder 214, the encoder component 216 of the second autoencoder 214 is trained to receive a beamformed radar data set at its input layer 220 and to output at the terminal layer 222 an embedding of the beamformed radar data set in a second latent space that is different from the first latent space corresponding to the first autoencoder 202. In other words, the encoder component 216 is trained to perform a kind of compression by encoding a beamformed radar data set into an embedding that is a lower-dimensional representation of the beamformed radar data set in the second latent space. As a result of training of the second autoencoder 214, the decoder component 218 is trained to receive an embedding of beamformed radar data in the second latent space at its input layer 222 and to output the full beamformed radar data at its output layer 224. Thus, the decoder component 218 is trained to recover a full beamformed radar data set from an embedding of that data set in the second latent space.

Figure 2C:
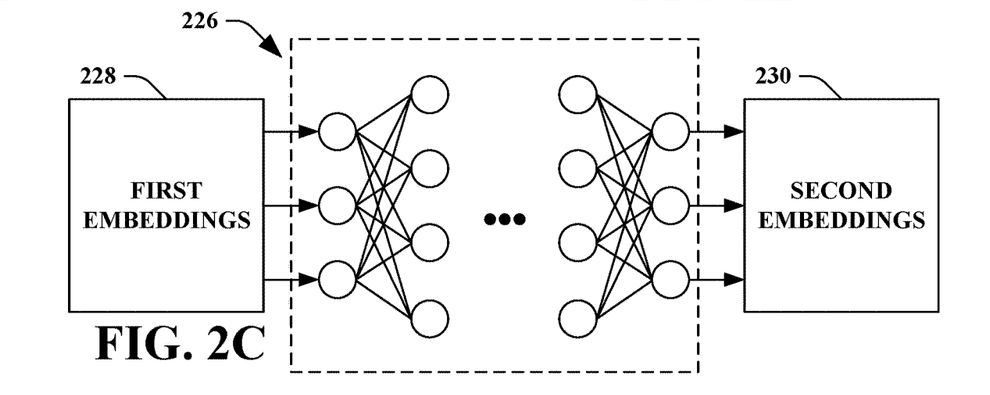
FIG. 2C is a diagram of an exemplary transformer neural network.

Referring now to FIG. 2C, a transformer neural network 226 is shown. In exemplary embodiments, the transformer neural network 126 can be configured in substantially similar fashion to the transformer neural network 226. The transformer neural network 226 is trained to receive one or more first embeddings 228 defined in the first latent space and to output one or more second embeddings 230 defined in the second latent space. The first latent space is a latent space that maps to a feature space in which radar data, such as radar data received from the ADC bank 112, is defined. The second latent space is a latent space that maps to a feature space in which beamformed radar data, such as beamformed data used to train the second autoencoder 214, is defined. Hence, the transformer neural network 226 is configured to transform a representation of a radar data set in the first latent space (e.g., the first embeddings 228) to a representation of a beamformed radar data set in the second latent space (e.g., the second embeddings 230). As will be described in greater detail below, the transformer neural network 226 is trained such that the beamformed radar data set of which the second embeddings 230 are representative is approximately equal to a beamformed version of the radar data set of which the first embeddings 228 are representative (e.g., generated by any of various beamforming algorithms).

Referring now to FIGS. 2A-2C, exemplary operations of the encoder component 204, the transformer neural network 226, and the decoder component 218 are now set forth for the purposes of further explanation. The encoder component 204 receives as input a radar data set for which receive-side beamforming is desirably performed. Responsive to receiving the radar data set, the encoder component 204 outputs the first embeddings 228 that are defined in the first latent space. The radar data set can comprise a plurality of channels, wherein each channel of the radar data set is representative of radar returns received from a respective antenna of an antenna array. The encoder component 204 executes over each of the channels independently. In other words, the encoder component 204 receives a first channel of the radar data set at the input layer 210 and outputs a first embedding representative of the first channel, and receives a second channel of the radar data set at the input layer 210 and outputs a second embedding representative of the second channel. In various embodiments, multiple instances of the encoder component 204 execute over the channels of the radar data set in parallel. In other embodiments, the encoder component 204 can execute over the channels sequentially. The first embeddings 228 include the embeddings generated by the encoder component 204 for each of the channels of the radar data set.

The transformer neural network 226 receives the first embeddings 228 defined in the first latent space as input and outputs the second embeddings 230 that are defined in the second latent space. Whereas the first embeddings 228 can include a different respective embedding for each of a plurality of channels of the radar data, the transformer neural network 226 is trained such that the second embeddings 230 include a different respective embedding for each of a plurality of beams that are desirably identified in a beamformed radar data set corresponding to the radar data set received at the encoder component 204. A number of beams in the second embeddings 230 can be selected based upon a number of beams desirably identified in the beamformed radar data set.

The decoder component 218 receives the second embeddings 230 from the transformer neural network 226, and outputs beamformed radar data. The decoder component 218 is configured to decode embeddings defined in the second latent space into beamformed radar data defined in a same feature space as the initial radar data set received by the encoder component 104. The decoder component 218 decodes each of the second embeddings 230 independently, either in parallel by separate instances of the decoder component 218 or sequentially. The output of the decoder component 218 with respect to each of the embeddings is a "beam" of beamformed radar data, wherein each of the beams is a subset of the beamformed radar data corresponding to a particular angle or range of angles within the FOV encompassed by the radar data received by the encoder component 204.

It is to be understood that while pictorial representations of various neural networks described herein are set forth in FIGS. 2A-2C, the neural networks described herein are not limited by such representations. For instance, a neural network depicted in FIGS. 2A-2C can have a different number of nodes in a layer than depicted in any of FIGS. 2A-2C, can have a different configuration of connections between nodes in different layers than shown in FIGS. 2A-2C, etc. Furthermore, while the autoencoders 202, 214 are shown as having substantially similar configurations, it is to be understood that the autoencoders 202, 214 can have different numbers of layers, different numbers of nodes within each layer, different configurations of connections between nodes, etc.

Figure 3:
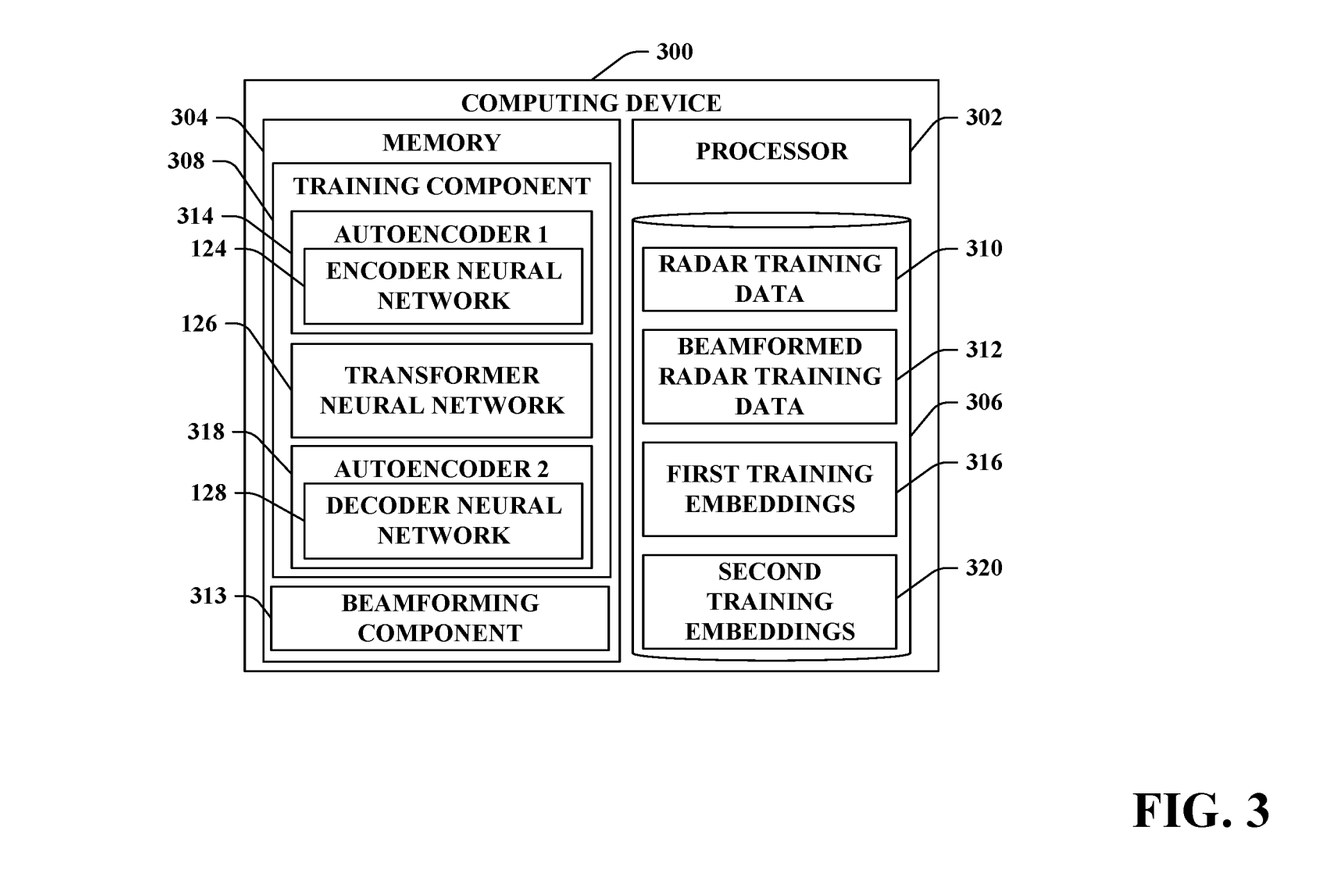
FIG. 3 is a functional block diagram of an exemplary computing system for training various neural networks disclosed herein.

Referring once again to FIG. 1, the transformer neural network 126 receives the first embeddings 125 in the first latent space and outputs Referring now to FIG. 3, an exemplary computing device 300 that facilitates training of various neural networks that are described herein is illustrated. The computing device 300 comprises a processor 302, memory 304 that stores instructions that are executed by the processor, and a data store 306 that stores various training data. The memory 304 comprises a training component 308 that is configured to train the encoder neural network 124, the transformer neural network 126, and the decoder neural network 128. The data store 306 includes radar training data 310 and beamformed radar training data 312. The radar training data 310 comprises radar data that is indicative of radar returns received by way of a radar sensor. In various embodiments, the radar training data 310 can be radar data that is representative of radar returns received by a type of sensor with which the neural networks 124, 126, 128 are to be configured to operate. The beamformed radar training data 312 is a representation of the radar training data 310 subsequent to a receive-side beamforming algorithm being executed over the radar training data 310. The receive-side beamforming algorithm can be any of various receive-side beamforming algorithms. In various embodiments, the beamformed radar training data 312 can be received by the computing device 300 from another system or device that is configured to execute the receive-side beamforming algorithm over the radar training data 310 in order to generate the beamformed radar training data 312. In other embodiments, the memory 304 can further include a beamforming component 313 that is configured to generate the beamformed radar training data 312 by executing a receive-side beamforming algorithm over the radar training data 310.

The training component 308 trains the encoder neural network 124 as an encoder component of a first autoencoder 314. The training component 308 trains the first autoencoder 314 based upon the radar training data 310 such that the first autoencoder 314 reproduces its input. In other words, the training component 308 provides the radar training data 310 as input to the first autoencoder 314 and successively updates weights of nodes and edges of the first autoencoder 314 such that the output of the first autoencoder 314 is approximately equal to its input. The successive updating of the weights of the nodes and edges can be performed substantially any number of times. In exemplary embodiments, the successive updating can be performed until a computational budget is exhausted (e.g., a threshold number of computing cycles has been performed or a threshold amount of time for the successive updating has elapsed). In other embodiments, the successive updating can be performed until an output quality threshold is reached. By way of example, and not limitation, the successive updating of the weights can be performed until the output of the first autoencoder 314 is within a threshold deviation from the input provided to the first autoencoder 314.

As a result of the first autoencoder 314 being trained to reproduce its input based on the radar training data 310, the encoder neural network 124 is trained to output an embedding of its input in a first latent space. Once the encoder neural network 124 is trained, the training component 308 provides the radar training data 310 to the trained encoder neural network 124 as input, and the trained encoder neural network 124 outputs embeddings of the radar training data 310 in the first latent space. These embeddings can be stored in the data store 306 as first training embeddings 316.

The training component 308 trains the decoder neural network 128 as a decoder component of a second autoencoder 318. The training component 308 trains the second autoencoder 318 based upon the beamformed radar training data 312 such that the second autoencoder 318 reproduces its input. Stated differently, the training component 308 provides the beamformed radar training data 312 as input to the second autoencoder 318 and successively updates weights of nodes and edges of the second autoencoder 318 such that the output of the second autoencoder 318 is approximately equal to its input. The training component 308 can continue the successive updating of the weights until a computational budget is exhausted or until an output quality threshold is reached.

As a result of the second autoencoder 318 being trained to reproduce its input based on the beamformed radar training data 312, an encoder component (not shown) of the second autoencoder 318 is trained to output an embedding of its input in a second latent space. Further, the decoder neural network 128 is trained to receive an embedding of beamformed radar data in the second latent space as input and to reproduce the beamformed radar data at the output of the decoder neural network 128. Once the second autoencoder 318 is trained, the training component 308 provides the beamformed radar training data 312 to the encoder component of the second autoencoder 318. Responsive to receipt of the beamformed radar training data 312 as input, the encoder component of the second autoencoder 318 outputs embeddings of the beamformed radar training data 312 in the second latent space, which embeddings can be stored in the data store 306 as second training embeddings 320.

The training component 308 trains the transformer neural network 126 to transform embeddings defined in the first latent space (corresponding to output of the encoder neural network 124) to embeddings defined in the second latent space (corresponding to input of the decoder neural network 128). In various exemplary embodiments, the training component 308 trains the transformer neural network 126 based upon the first training embeddings 316 and the second training embeddings 320. The training component 308 trains the transformer neural network 126 to transform the first training embeddings 316 to the second training embeddings 320. In other words, the training component 308 trains the transformer neural network 126 such that the transformer neural network 126 outputs the second training embeddings 320 responsive to receipt of the first training embeddings 316 as input. The first training embeddings 316 are embeddings of the radar training data 310 in the first latent space, and the second training embeddings 320 are embeddings of the beamformed radar training data 312. The beamformed radar training data 312 is a beamformed version of the radar training data 310, and thus the transformer neural network 126 is trained to transform a latent space representation of radar data to a latent space representation of that same radar data subsequent to beamforming.

Figure 4:
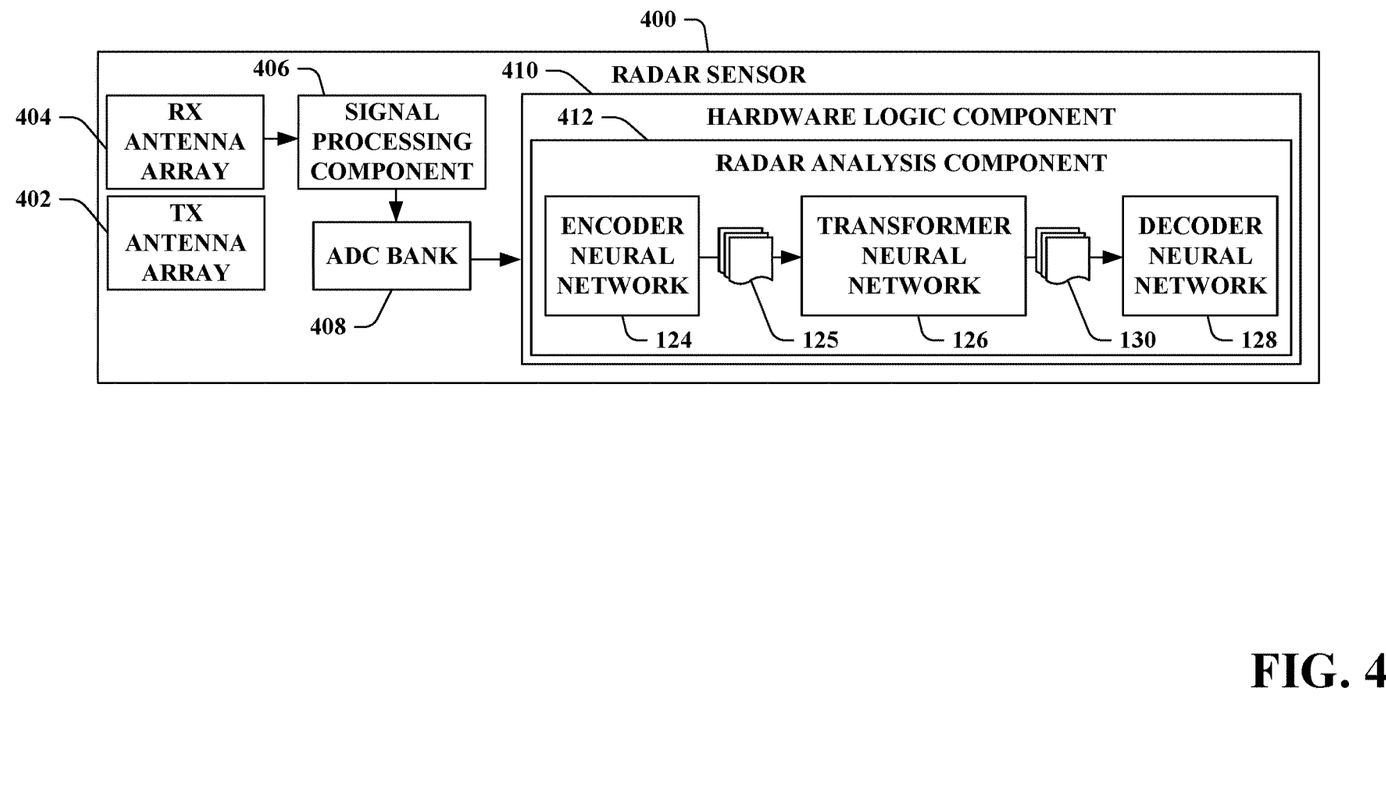
FIG. 4 is a functional block diagram of an exemplary radar sensor for generating beamformed radar data by way of latent space encoding.

As noted above, in some embodiments the encoder neural network 124, the transformer neural network 126, and the decoder neural network 128 can all be executed on a same hardware logic component. By way of example, and referring now to FIG. 4, an exemplary radar sensor 400 is shown. The radar sensor 400 can include a transmit antenna array 402, a receive antenna array 404, a signal processing component 406, and an ADC bank 408 configured in substantially similar fashion to the analogous components of the radar sensor 102. The radar sensor 400 further includes a hardware logic component 410 that in turn includes a radar analysis component 412. Whereas the system 100 further includes a computing device on which the transformer neural network 126 and the decoder neural network 128 are executed, the radar analysis component 412 of the radar sensor 400 includes all of the encoder neural network 124, the transformer neural network 126, and the decoder neural network 128. In other words, operations of these neural networks 124, 126, 128 described above are, in the radar sensor 400, performed by a same hardware logic component 410.

Figure 5:
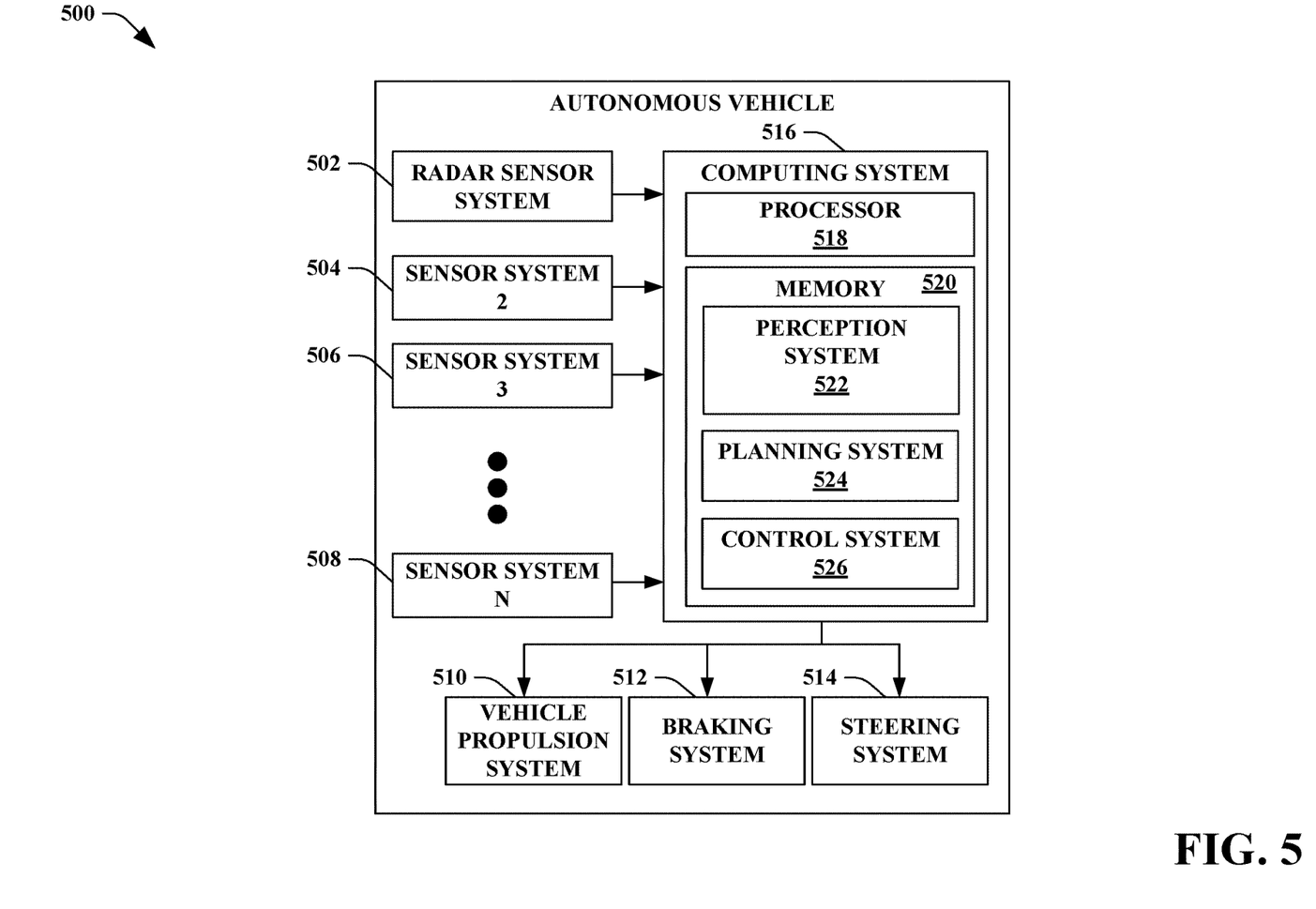
FIG. 5 is a functional block diagram of an exemplary AV.

Various technologies described herein are suitable for use in connection with an autonomous vehicle (AV) that employs a radar system to facilitate navigation about roadways. Referring now to FIG. 5, an exemplary AV 500 is illustrated, wherein the AV 500 can navigate about roadways without human conduction based upon sensor signals output by sensor systems of the AV 500. The AV 500 includes a plurality of sensor systems 502-508 (a first sensor system 502 through an Nth sensor system 508). The sensor systems 502-508 may be of different types. For example, the first sensor system 502 is a radar sensor system, the second sensor system 504 may be a lidar sensor system, the third sensor system 506 may be a camera (image) system, and the Nth sensor system 508 may be a sonar system. Other exemplary sensor systems include GPS sensor systems, inertial sensor systems, infrared sensor systems, and the like. The various sensor systems 502-508 are arranged about the AV 500. The sensor systems 502-508 are configured to repeatedly (e.g. continuously, or periodically) output sensor data that is representative of objects and conditions in the driving environment of the AV 500.

The AV 500 further includes several mechanical systems that are used to effectuate appropriate motion of the AV 500. For instance, the mechanical systems can include but are not limited to, a vehicle propulsion system 510, a braking system 512, and a steering system 514. The vehicle propulsion system 510 may be an electric engine, an internal combustion engine, or a combination thereof. The braking system 512 can include an engine brake, brake pads, actuators, a regenerative braking system, and/or any other suitable componentry that is configured to assist in decelerating the AV 500. The steering system 514 includes suitable componentry that is configured to control the direction of movement of the AV 500.

The AV 500 additionally comprises a computing system 516 that is in communication with the sensor systems 502-508 and is further in communication with the vehicle propulsion system 510, the braking system 512, and the steering system 514. The computing system 516 includes a processor 518 and memory 520 that includes computer-executable instructions that are executed by the processor 518. In an example, the processor 518 can be or include a graphics processing unit (GPU), a plurality of GPUs, a central processing unit (CPU), a plurality of CPUs, an application-specific integrated circuit (ASIC), a microcontroller, a programmable logic controller (PLC), a field programmable gate array (FPGA), or the like.

The memory 520 comprises a perception system 522, a planning system 524, and a control system 526. Briefly, the perception system 522 is configured to identify the presence of objects and/or characteristics of objects in the driving environment of the AV 500. The planning system 524 is configured to plan a route and/or a maneuver of the AV 500 based upon data pertaining to objects in the driving environment that are output by the perception system 522. The control system 526 is configured to control the mechanical systems 510-514 of the AV 500 to effectuate appropriate motion to cause the AV 500 to execute a maneuver planned by the planning system 524.

The perception system 522 is configured to identify objects in proximity to the AV 500 that are captured in sensor signals output by the sensor systems 502-508. By way of example, the perception system 522 can be configured to identify the presence of an object in the driving environment of the AV 500 based upon images generated by a camera system included in the sensor systems 504-508. In another example, the perception system 522 can be configured to determine a range to an object in the driving environment of the AV 500, a three-dimensional position of the object, or a radar cross-section of the object, based upon beamformed radar data output by the radar sensor system 502. In exemplary embodiments, the radar sensor system 502 can be or include the radar sensor 400. In other embodiments, the radar sensor system 502 can be or include the radar sensor 102. In these embodiments, operations of the radar analysis component 122 can be performed by the perception system 522.

Figure 6:
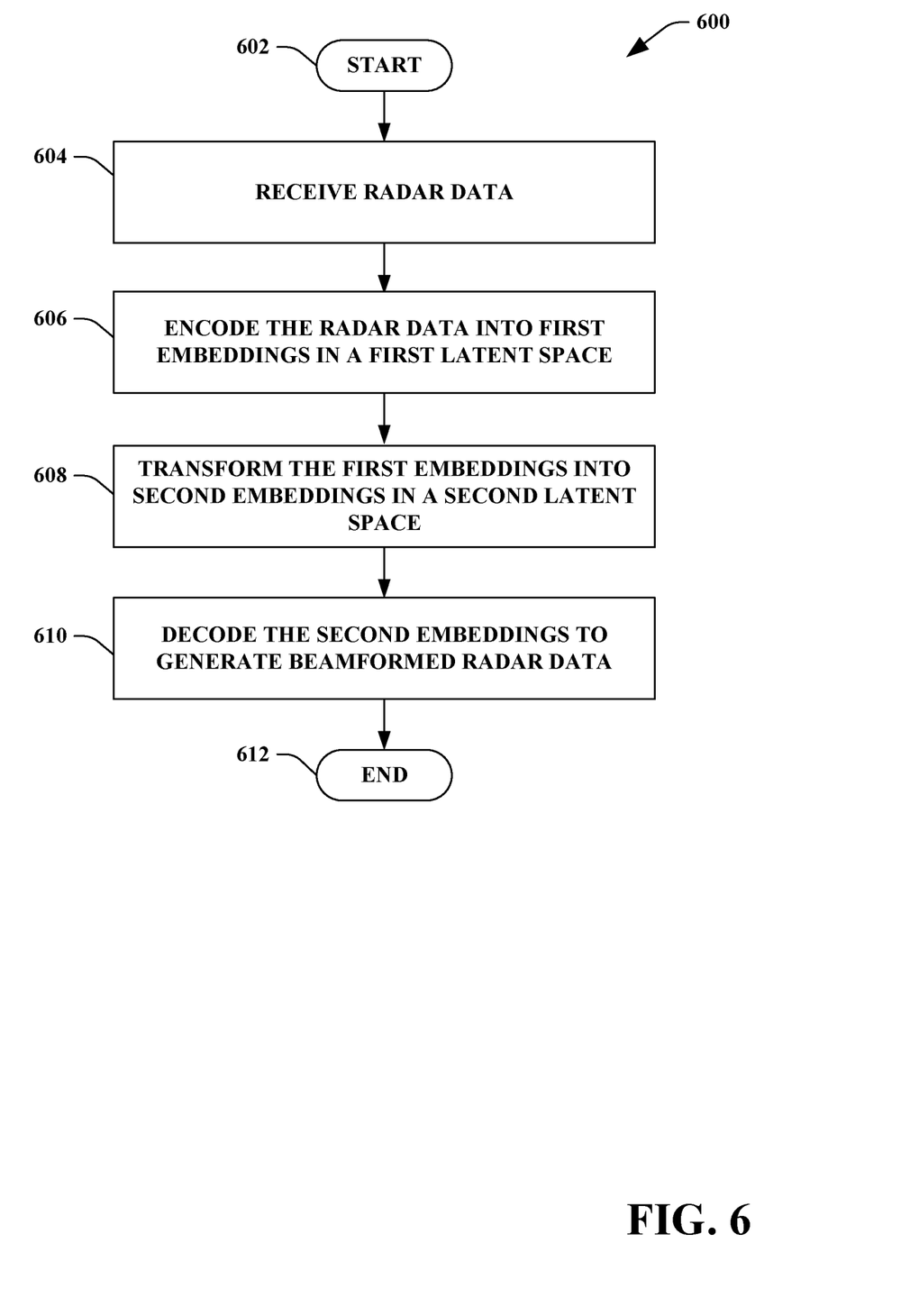
FIG. 6 is a flow diagram that illustrates an exemplary methodology for generating beamformed radar data by way of latent space encoding.
Figure 7:
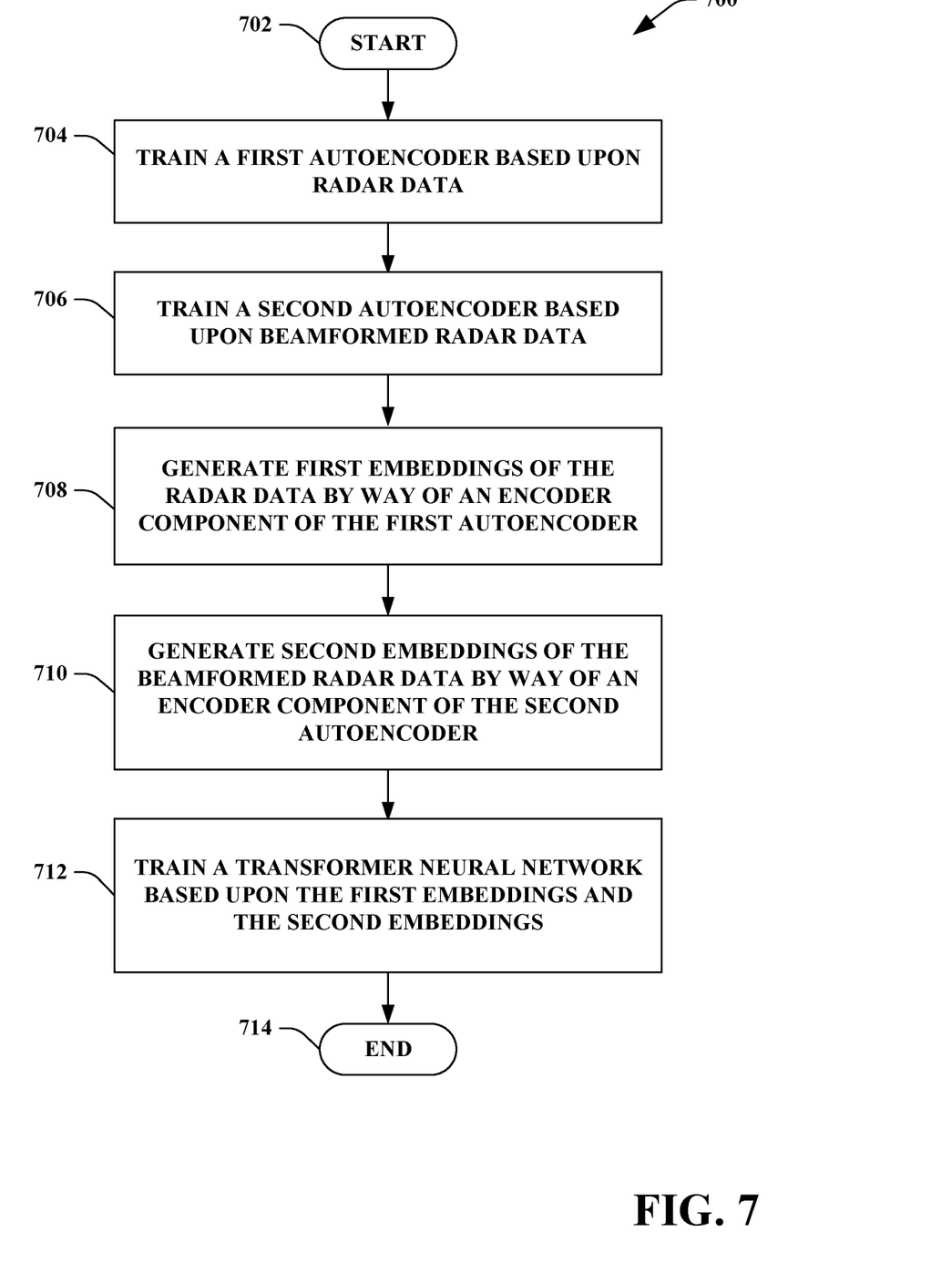
FIG. 7 is an exemplary methodology for training various neural networks for use in a radar sensor that generates beamformed radar data.

FIGS. 6-7 illustrate exemplary methodologies relating to generating receive-side-beamformed radar data by way of latent space encoding of radar data. While the methodologies are shown and described as being a series of acts that are performed in a sequence, it is to be understood and appreciated that the methodologies are not limited by the order of the sequence. For example, some acts can occur in a different order than what is described herein. In addition, an act can occur concurrently with another act. Further, in some instances, not all acts may be required to implement a methodology described herein.

Moreover, the acts described herein may be computer-executable instructions that can be implemented by one or more processors and/or stored on a computer-readable medium or media. The computer-executable instructions can include a routine, a sub-routine, programs, a thread of execution, and/or the like. Still further, results of acts of the methodologies can be stored in a computer-readable medium, displayed on a display device, and/or the like.

Referring now to FIG. 6, a methodology 600 that facilitates generating beamformed radar data by way of latent space encoding is illustrated. The methodology 600 begins at 602 and at 604, radar data is received. The radar data can be computer-readable data that is indicative of radar returns received by way of a radar antenna array. At 606, the radar data is encoded into first embeddings in a first latent space. In an exemplary embodiment, the radar data is encoded into the first embeddings in the first latent space by way of an encoder neural network component (e.g., the encoder neural network 124) that is trained as an encoder component of a first autoencoder. At 608, the first embeddings are transformed into second embeddings in a second latent space. By way of example, and not limitation, the first embeddings can be provided as input to a transformer neural network that is configured to receive embeddings defined in the first latent space and to output embeddings defined in the second latent space. At 610 the second embeddings are decoded to generate beamformed radar data. The beamformed radar data can be substantially equivalent to beamformed radar data generated by execution of a beamforming algorithm over the radar data received at 604. In an exemplary embodiment, the second embeddings are decoded by way of a decoder neural network component (e.g., the decoder neural network 128) that is trained as a decoder component of a second autoencoder. The methodology 600 ends at 612.

Referring now to FIG. 7, a methodology 700 that facilitates training of various neural networks for use in generating beamformed radar data is illustrated. The methodology 700 begins at 702 and at 704 a first autoencoder is trained based upon radar data that is representative of radar returns received by way a radar antenna array. The first autoencoder can include a first encoder component and a first decoder component. The first autoencoder is trained to reproduce, at its output layer, an input received at its input layer. As a result of training of the first autoencoder, the first encoder component is trained to receive radar data and to output embeddings of the radar data in a first latent space.

At 706, a second autoencoder is trained based upon beamformed radar data. In exemplary embodiments, the beamformed radar data can be generated by execution of a beamforming algorithm over the radar data used to train the first autoencoder. The second autoencoder can include a second encoder component and a second decoder component. The second autoencoder is trained to reproduce, at its output layer, an input received at its input layer. As a result of training of the second autoencoder, the second encoder component is trained to receive beamformed radar data and to output embeddings of the beamformed radar data in a second latent space. Further, the second decoder component is trained to receive embeddings of beamformed radar data in the second latent space and to output the beamformed radar data. In other words, the second decoder component is configured to decode embeddings of beamformed radar data in the second latent space.

At 708, first embeddings are generated by way of the first encoder component, wherein the first embeddings are embeddings of the radar data in the first latent space. At 710, second embeddings are generated by way of the second encoder component, wherein the second embeddings are embeddings of the beamformed radar data in the second latent space. At 712, a transformer neural network is trained based upon the first embeddings and the second embeddings such that, responsive to receiving the first embeddings as input, the transformer neural network outputs the second embeddings. In other words, at 712 the transformer neural network is trained to transform embeddings of radar data from a first latent space into equivalent embeddings in a second latent space from which beamformed radar data can be recovered. Subsequent to the training of the first autoencoder at 704, the second autoencoder at 706, and the transformer neural network at 712, the first encoder component can be employed as the encoder neural network 124, the transformer neural network can be employed as the transformer neural network 126, and the second decoder component can be employed as the decoder neural network 128. The methodology 700 completes at 714.

Figure 8:
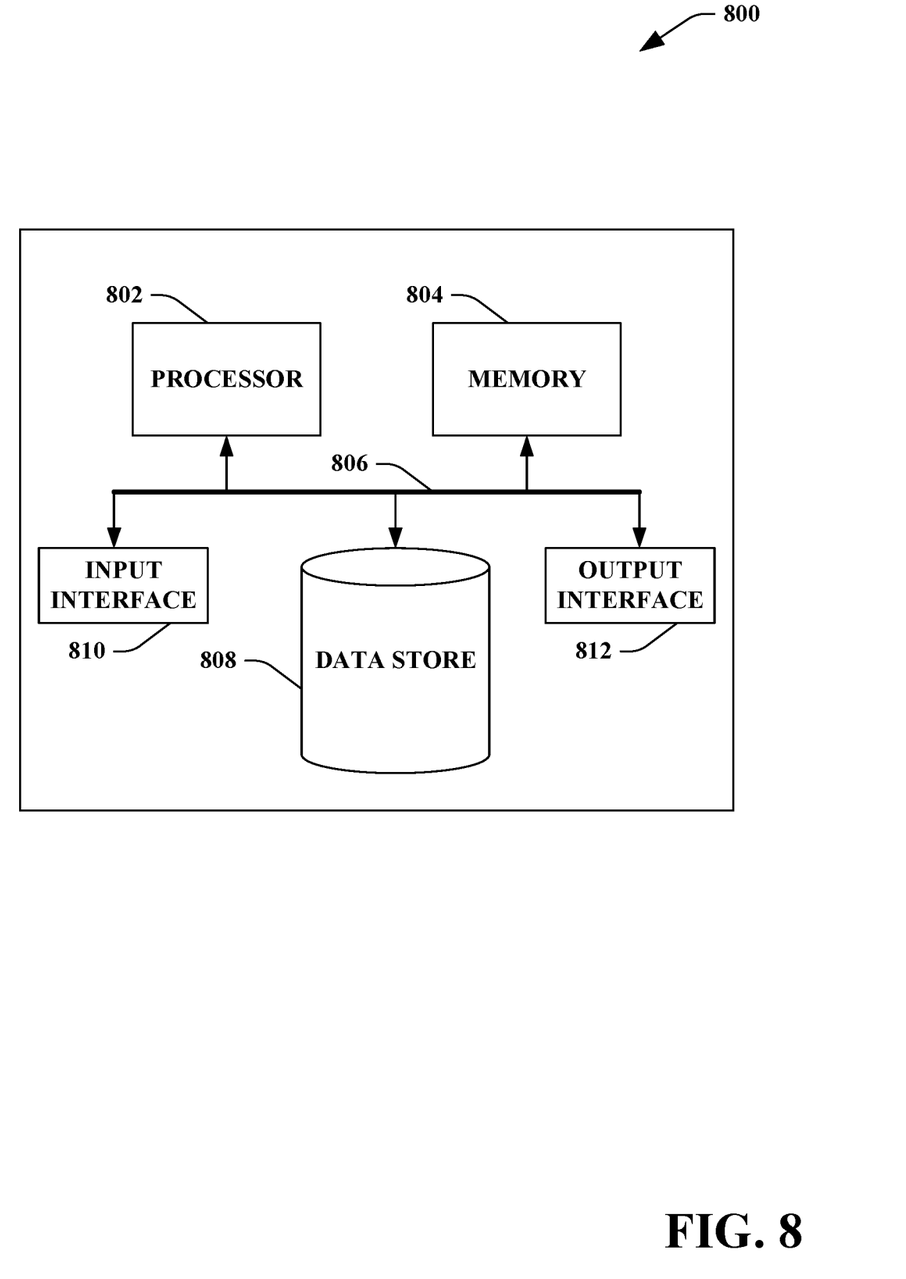
FIG. 8 is an exemplary computing system.

Referring now to FIG. 8, a high-level illustration of an exemplary computing device 800 that can be used in accordance with the systems and methodologies disclosed herein is illustrated. For instance, the computing device 800 may be or include the computing device 104 or the computing system 516. The computing device 800 includes at least one processor 802 that executes instructions that are stored in a memory 804. The instructions may be, for instance, instructions for implementing functionality described as being carried out by one or more modules, components, or systems discussed above or instructions for implementing one or more of the methods described above. The processor 802 may be a GPU, a plurality of GPUs, a CPU, a plurality of CPUs, a multi-core processor, etc. The processor 802 may access the memory 804 by way of a system bus 806. In addition to storing executable instructions, the memory 804 may also store radar data, beamformed radar data, neural network configurations, etc.

The computing device 800 additionally includes a data store 808 that is accessible by the processor 802 by way of the system bus 806. The data store 808 may include executable instructions, radar data, beamformed radar data, embeddings of these data in latent spaces, etc. The computing device 800 also includes an input interface 810 that allows external devices to communicate with the computing device 800. For instance, the input interface 810 may be used to receive instructions from an external computing device, etc. The computing device 800 also includes an output interface 812 that interfaces the computing device 800 with one or more external devices. For example, the computing device 800 may transmit control signals to the vehicle propulsion system 510, the braking system 512, and/or the steering system 514 by way of the output interface 812.

Additionally, while illustrated as a single system, it is to be understood that the computing device 800 may be a distributed system. Thus, for instance, several devices may be in communication by way of a network connection and may collectively perform tasks described as being performed by the computing device 800.

Various functions described herein can be implemented in hardware, software, or any combination thereof. If implemented in software, the functions can be stored on or transmitted over as one or more instructions or code on a computer-readable medium. Computer-readable media includes computer-readable storage media. A computer-readable storage media can be any available storage media that can be accessed by a computer. By way of example, and not limitation, such computer-readable storage media can comprise RAM, ROM, EEPROM, CD-ROM or other optical disk storage, magnetic disk storage or other magnetic storage devices, or any other medium that can be used to store desired program code in the form of instructions or data structures and that can be accessed by a computer. Disk and disc, as used herein, include compact disc (CD), laser disc, optical disc, digital versatile disc (DVD), floppy disk, and Blu-ray disc (BD), where disks usually reproduce data magnetically and discs usually reproduce data optically with lasers. Further, a propagated signal is not included within the scope of computer-readable storage media. Computer-readable media also includes communication media including any medium that facilitates transfer of a computer program from one place to another. A connection, for instance, can be a communication medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio and microwave are included in the definition of communication medium. Combinations of the above should also be included within the scope of computer-readable media.

Alternatively, or in addition, the functionally described herein can be performed, at least in part, by one or more hardware logic components. For example, and without limitation, illustrative types of hardware logic components that can be used include FPGAs, ASICs, Application-specific Standard Products (ASSPs), System-on-a-chip systems (SOCs), Complex Programmable Logic Devices (CPLDs), etc.

The features described herein relate to systems and methods for beamforming radar data by way of latent space encoding according to at least the examples provided below:

(A1) In one aspect, some embodiments include a system that comprises a radar antenna array, a hardware logic component, and a computing device, where the hardware logic component and the computing device are configured to collectively perform various acts. The various acts are each performed by one or more of the hardware logic component or the computing device and include encoding radar data into a first embedding, where the radar data is indicative of a radar return received by the radar antenna array from an FOV of the radar antenna array. The acts further include transforming the first embedding to a second embedding by providing the first embedding as input to a neural network, wherein the second embedding is included in output of the neural network. The acts include, still further, decoding the second embedding to generate beamformed radar data, wherein the beamformed radar data is indicative of a partial radar return received by the radar antenna array from a subset of the FOV of the radar antenna array.

(A2) In some embodiments of the system of (A1) the first embedding has lower dimensionality than the radar data.

(A3) In some embodiments of the systems of at least one of (A1)-(A2), the neural network is a first neural network, and encoding the radar data into the first embedding comprises: providing the radar data to a second neural network configured to map input to a latent space, wherein the first embedding is output by the second neural network and is a mapping of the radar data in the latent space.

(A4) In some embodiments of the system of at least (A3), the second neural network is trained as an encoder component of an autoencoder.

(A5) In some embodiments of the system of at least (A4), the autoencoder is trained based upon radar training data.

(A6) In some embodiments of the systems of at least one of (A3)-(A5), the latent space is a first latent space, and the first neural network is configured to map input from the first latent space to a second latent space.

(A7) In some embodiments of the system of at least (A6), decoding the second embedding to generate beamformed radar data comprises: providing the second embedding to a third neural network configured to map input from the second latent space to a space corresponding to the radar data, wherein the beamformed radar data is included in output of the third neural network.

(A8) In some embodiments of the systems of at least one of (A1)-(A7), the neural network is a first neural network, and decoding the second embedding to generate beamformed radar data comprises: providing the second embedding to a second neural network configured to map input from a latent space to a space corresponding to the radar data, wherein the beamformed radar data is included in the output of the second neural network.

(A9) In some embodiments of the system of at least (A8), the second neural network is trained as a decoder component of an autoencoder.

(B1) In another aspect, some embodiments include a method, where the method includes receiving radar data that is indicative of radar returns received by a radar antenna array from a field of view (FOV) of the radar antenna array, wherein the radar data is indicative of radar returns from a plurality of antennas in the radar antenna array. The method of (B1) further includes encoding the radar data into a first plurality of embeddings, wherein each of the first plurality of embeddings is a mapping into a first latent space of a radar return from a different respective antenna in the plurality of antennas. The method of (B1) further includes transforming the first plurality of embeddings into a second plurality of embeddings in a second latent space by way of a neural network. Still further, the method of (B1) includes decoding the second plurality of embeddings to generate beamformed radar data, the beamformed data comprising a plurality of beams, wherein each of the beams is representative of radar returns received by the radar antenna array from a subset of the FOV of the radar antenna array.

(B2) In some embodiments of the method of (B1), each of the beams comprises a decoded embedding from the second plurality of embeddings.

(B3) In some embodiments of the methods of at least one of (B1)-(B2), decoding the second plurality of embeddings comprises providing each of the second plurality of embeddings independently as input to a second neural network configured to map data from the second latent space to a space corresponding to the radar data.

(B4) In some embodiments of the method of (B3) providing each of the second plurality of embeddings independently as input to the second neural network comprises providing, in parallel, each of the second plurality of embeddings to a respective instance of the second neural network.

(B5) In some embodiments of the methods of at least one of (B1)-(B4), the radar data includes first radar data and second radar data, the first radar data being indicative of radar returns from a first antenna in the plurality of antennas, the second radar data being indicative of radar returns from a second antenna in the plurality of antennas. In the method of (B5), encoding the radar data into the first plurality of embeddings comprises providing the first radar data as input to a first instance of a second neural network, the second neural network configured to map radar data into the first latent space; and providing the second radar data as input to a second instance of the second neural network.

(B6) In some embodiments of the methods of at least one of (B1)-(B5), transforming the first plurality of embeddings into the second plurality of embeddings comprises providing the first plurality of embeddings as input to the neural network simultaneously, wherein responsive to receipt of the first plurality of embeddings the neural network outputs the second plurality of embeddings.

(C1) In still another aspect, some embodiments include a system that comprises a hardware logic component that is configured to perform various acts. The acts performed by the hardware logic component include encoding radar data into a first embedding, where the radar data is indicative of a radar return received by a radar antenna array from an FOV of the radar antenna array. The acts performed by the hardware logic component further include transforming the first embedding to a second embedding by providing the first embedding as input to a neural network, wherein the second embedding is included in output of the neural network. Still further, the acts performed by the hardware logic component include decoding the second embedding to generate beamformed radar data, wherein the beamformed radar data is indicative of a partial radar return received by the radar antenna array from a subset of the FOV of the radar antenna array.

(C2) In some embodiments of the system of at least (C1), the neural network is a first neural network, and encoding the radar data into the first embedding comprises providing the radar data to a second neural network that is trained to encode radar data in a latent space, wherein responsive to receipt of the radar data the second neural network outputs the first embedding.

(C3) In some embodiments of the system of at least (C2), the latent space is a first latent space, and decoding the second embedding comprises providing the second embedding to a third neural network that is trained to decode embeddings defined in a second latent space, wherein responsive to receipt of the second embedding the third neural network outputs the beamformed radar data.

(C4) In some embodiments of the system of at least (C3), the first neural network is trained based upon a plurality of embeddings output by the second neural network and a plurality of embeddings output by the third neural network.

What has been described above includes examples of one or more embodiments. It is, of course, not possible to describe every conceivable modification and alteration of the above devices or methodologies for purposes of describing the aforementioned aspects, but one of ordinary skill in the art can recognize that many further modifications and permutations of various aspects are possible. Accordingly, the described aspects are intended to embrace all such alterations, modifications, and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A system comprising:
   a radar antenna array;
   a hardware logic component; and
   a computing device, wherein the hardware logic component and the computing device are configured to collectively perform acts comprising:
      responsive to receipt of radar data that is indicative of a radar return received by the radar antenna array from a field of view (FOV) of the radar antenna array, encoding the radar data into a first embedding, wherein encoding the radar data into the first embedding comprises providing the radar data to a first neural network configured to map input to a first latent space, and wherein the first embedding is output by the first neural network and is a mapping of the radar data in the first latent space;
      transforming the first embedding to a second embedding by providing the first embedding as input to a second neural network, wherein the second embedding is included in output of the second neural network, wherein the second embedding is representative of beamformed radar data in a second latent space, and wherein the second neural network is configured to map input from the first latent space to the second latent space; and
      decoding the second embedding to generate the beamformed radar data, wherein the beamformed radar data is indicative of a partial radar return received by the radar antenna array from a subset of the FOV of the radar antenna array.

2. The system of claim 1, wherein the first embedding has lower dimensionality than the radar data.

3. The system of claim 1, wherein the first neural network is trained as an encoder component of an autoencoder.

4. The system of claim 3, wherein the autoencoder is trained based upon radar training data.

5. The system of claim 1, wherein decoding the second embedding to generate the beamformed radar data comprises:
   providing the second embedding to a third neural network configured to map input from the second latent space to a space corresponding to the radar data, wherein the beamformed radar data is included in output of the third neural network.

6. The system of claim 5, wherein the third neural network is trained as a decoder component of an autoencoder.

7. The system of claim 6, wherein the autoencoder is trained based upon beamformed radar training data.

8. A method, comprising:
receiving radar data that is indicative of radar returns received by a radar antenna array from a field of view (FOV) of the radar antenna array, wherein the radar data is indicative of radar returns from a plurality of antennas in the radar antenna array;
encoding the radar data into a first plurality of embeddings, wherein each of the first plurality of embeddings is a mapping into a first latent space of a radar return from a different respective antenna in the plurality of antennas, wherein the first plurality of embeddings are representative of the radar data in the first latent space;
transforming the first plurality of embeddings into a second plurality of embeddings in a second latent space by way of a neural network, wherein transforming the first plurality of embeddings into the second plurality of embeddings comprises providing the first plurality of embeddings as input to the neural network simultaneously, wherein responsive to receipt of the first plurality of embeddings the neural network outputs the second plurality of embeddings, and wherein the second plurality of embeddings are representative of beamformed radar data in the second latent space; and
decoding the second plurality of embeddings to generate the beamformed radar data, the beamformed data comprising a plurality of beams, wherein each of the beams is representative of radar returns received by the radar antenna array from a subset of the FOV of the radar antenna array.

9. The method of claim 8, wherein each of the beams comprises a decoded embedding from the second plurality of embeddings.

10. The method of claim 8, wherein decoding the second plurality of embeddings comprises providing each of the second plurality of embeddings independently as input to a second neural network configured to map data from the second latent space to a space corresponding to the radar data.

11. The method of claim 10, wherein providing each of the second plurality of embeddings independently as input to the second neural network comprises providing, in parallel, each of the second plurality of embeddings to a respective instance of the second neural network.

12. The method of claim 8, wherein the radar data includes first radar data and second radar data, the first radar data being indicative of radar returns from a first antenna in the plurality of antennas, the second radar data being indicative of radar returns from a second antenna in the plurality of antennas, wherein encoding the radar data into the first plurality of embeddings comprises:
providing the first radar data as input to a first instance of a second neural network, the second neural network configured to map radar data into the first latent space; and
providing the second radar data as input to a second instance of the second neural network.

13. A system comprising:
a hardware logic component configured to perform acts comprising:
responsive to receipt of radar data that is indicative of a radar return received by a radar antenna array from a field of view (FOV) of the radar antenna array, encoding the radar data into a first embedding, wherein encoding the radar data into the first embedding comprises providing the radar data to a first neural network that is trained to encode the radar data to a first latent space, and wherein responsive to receipt of the radar data the first neural network outputs the first embedding;
transforming the first embedding to a second embedding by providing the first embedding as input to a second neural network, wherein the second embedding is included in output of the second neural network, and wherein the second embedding is representative of beamformed radar data in a second latent space; and
decoding the second embedding to generate the beamformed radar data, wherein the beamformed radar data is indicative of a partial radar return received by the radar antenna array from a subset of the FOV of the radar antenna array.

14. The system of claim 13, wherein further decoding the second embedding comprises providing the second embedding to a third neural network that is trained to decode embeddings defined in the second latent space, wherein responsive to receipt of the second embedding the third neural network outputs the beamformed radar data.

15. The system of claim 14, wherein the second neural network is trained based upon a plurality of embeddings output by the first neural network and a plurality of embeddings output by the third neural network.

16. The system of claim 14, wherein the third neural network is trained as a decoder component of an autoencoder.

17. The system of claim 16, wherein the autoencoder is trained based upon beamformed radar training data.

18. The system of claim 13, wherein the first embedding has lower dimensionality than the radar data.

19. The system of claim 13, wherein the first neural network is trained as an encoder component of an autoencoder.

20. The system of claim 19, wherein the autoencoder is trained based upon radar training data.

* * * * *